Jan. 20, 1970  R. W. WARFIELD ET AL  3,490,273
METHOD FOR DETERMING YOUNG'S MODULUS AND BULK MODULUS
Filed April 23, 1968

Robert W. Warfield
Joseph E. Cuevas
F. Robert Barnet
J. O. Outwater
    INVENTORS

BY

United States Patent Office 3,490,273
Patented Jan. 20, 1970

3,490,273
METHOD FOR DETERMINING YOUNG'S MODULUS AND BULK MODULUS
Robert W. Warfield, Germantown, Joseph E. Cuevas, Takoma Park, and Frederick R. Barnet, Kensington, Md., and John O. Outwater, Burlington, Vt., assignors to the United States of America as represented by the Secretary of the Navy
Filed Apr. 23, 1968, Ser. No. 723,480
Int. Cl. G01l 7/16; G01n 3/08
U.S. Cl. 73—89
4 Claims

ABSTRACT OF THE DISCLOSURE

A method of determining Young's modulus, bulk modulus and Poisson's ratio from a single cylindrical test specimen subjected to a single continuous test procedure where the specimen is first subjected to an axial compressive load while radially unconstrained, and subsequently in a continuous process subjected to an axial compressive load while radially constrained. Young's modulus is determined from a stress strain plot of the radially unconstrained axial load, bulk modulus is determined from a stress strain plot of the radially constrained axial load, and Poisson's ratio is determined mathematically from Young's and bulk modulus.

BACKGROUND OF THE INVENTION

This invention relates generally to the art of compression testing and more particularly to a method of determining a plurality of physical characteristics of a material from a single cylindrical test specimen.

The usefulness of a new material in engineering or scientific application is largely dependent upon the amount of knowledge available as to the physical characteristics and properties of the particular material. It has long been recognized that Young's modulus, bulk modulus, and Poisson's ratio are extremely important physical characteristics of a material which can be utilized when selecting a particular material to perform a particular function.

Young's modules (E) is defined as the ratio of unit stress to unit deformation or strain. Heretofore, Young's modulus has been determined by stretching or compressing a bar with a known axial load and measuring the length of the bar before and after applying the load. Dynamic measurements have also been utilized to determine Young's modulus.

Bulk modulus (B) is more difficult to determine, and is defined as the ratio of the hydrostatic pressure to the volume strain. The usual method for determining this parameter is to measure the decreased volume of a solid as it is subjected to a hydrostatic pressure.

Poisson's ratio ($\mu$) is determined mathematically from the following equation using known values of Young's and bulk modulus:

$$\mu = (3B-E)/6B$$

Prior art methods of determining Young's and bulk modulus have experienced various limitations and disadvantages in that they are very time consuming, require separate samples for the determination of each modulus, and must be performed on different types of apparatus. When dynamic methods are employed the results must be converted into isothermal data in order to compare the moduli obtained with the values obtained by non-dynamic means, and very often the values needed for converting the dynamic data are not available.

SUMMARY OF THE INVENTION

Accordingly, one object of this invention is the provision of a novel method for determining Young's and bulk modulus from a single test specimen.

Another object of the invention is the provision of a novel method for determining Young's and bulk modulus from a single test procedure performed on a single test specimen.

Still another object of the present invention is to provide a novel method for isothermally determining Young's and bulk modulus from a single test procedure performed on a single test specimen by a standard test instrument.

One other object of this invention is the provision of a novel method for isothermally determining Young's and bulk modulus and Poisson's ratio from a single test specimen undergoing a single compression test.

One still further object of this invention is the provision of a novel method for determining Young's modulus, bulk modulus and Poisson's ratio as a function of temperature from a single test procedure on a single test specimen.

Briefly, in accordance with one embodiment of this invention, these and other objects are obtained by applying a first axial compressive load to a cylindrical test specimen while allowing the specimen to freely expand radially, then radially constraining the specimen to a fixed predetermined diameter while the specimen is partially compressed, applying a second axially compressive load to the specimen simultaneous with the radial constraint, and measuring stress and strain during application of the first and second compressive loads whereby Young's modulus, bulk modulus, and Poisson's ratio may be determined.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
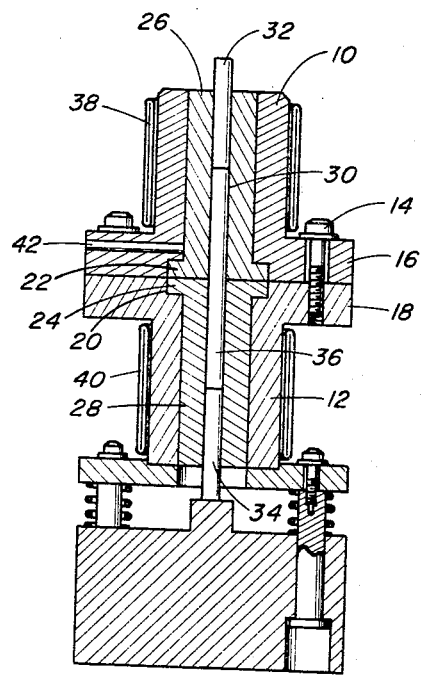
FIG. 1 is a plan sectional view of a standard compressibility tester.

Although the method of the present invention has been found most useful for determining the Young's and bulk modulus of polymeric solids having a Poisson's ratio of from approximately 0.30 to 0.50 it is not intended that the invention be so limited, and application of the method of the present invention to any solid is clearly within the scope of the present invention. The apparatus used in the method of the present invention, as shown in FIG. 1, is a standard piston displacement compressibility tester having an outer casing constructed of an upper casing section 10 secured to a lower casing section 12 by conventional means, such as screws 14, securely engaging circumferential flange members 16 and 18 on upper and lower casing sections 10 and 12 respectively. Held within an internally grooved section 20 of the upper and lower casing sections 10 and 12 are circumferential flange members 22 and 24 of upper and lower inner bushing members 26 and 28 respectively. The upper and lower inner bushing members 26 and 28 have an internal passage 30 of very closely toleranced internal diameter. Within the passage 30 is housed an upper plunger 32, a lower plunger 34 and the test specimen 36. The test specimen 36 is preferably a cylindrical machined rod of a predetermined length having a closely toleranced diameter of slightly less dimension than the internal diameter of passage 30 in inner bushing members 26 and 28. For example, with a passage 30 diameter of 0.2500 inch, +0.0001 inch, −0.0000 inch (0.6350 cm.) it would be desirable to use a test specimen having a diameter of 0.248 inch, +0.001 inch, −0.001 inch (0.63 cm.).

Once the tester is loaded with the specimen 36 between upper plunger 32 and lower plunger 34, it is placed on the fixed platen of a suitable loading instrument such as a Baldwin-Southwark, 30,000 kilogram Universal testing machine. The loading head of the testing machine is brought down so as to just touch the upper plunger of the tester. An automatic stress-strain recorder is started and a compressive load applied to the test specimen at a slow rate such as 0.025 inch per minute. The load must be applied as slowly as possible in order to attain isothermal conditions. As is standard in any compression test a plot of stress versus train is obtained.

Since the diameter of the specimen 36 is less than the internal diameter of passage 30 the length of the specimen will decrease and the diameter of the specimen will increase as the load is slowly applied. By measuring the decrease in length for a given applied load, Young's modulus is then calculated. When the diameter of the specimen has increased to equal the diameter of passage 30, so as to just fill the passage or bore of the compressibility tester, the specimen can no longer increase in diameter, and additional loading will result in volume change. In materials in which Poisson's ratio is relatively high, 0.30 or greater, the pressure is approximately hydrostatic. Thus, by applying a second axially compressive load to the specimen once the specimen has expanded to equal the diameter of passage 30, changes in volume will result, and from a stress-strain plot of this portion of the test the bulk modulus may be determined.

Figure 2:
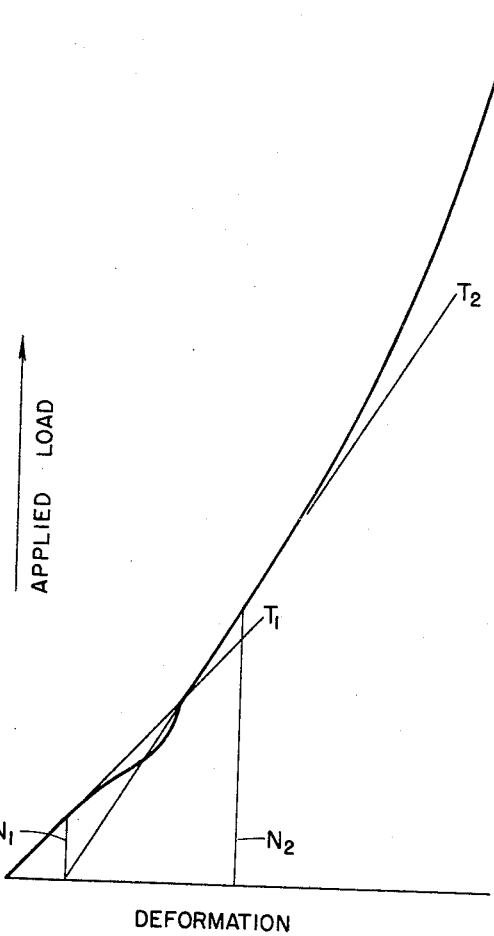
FIG. 2 is a typical stress-strain plot obtained by the method of the present invention.

Referring to the stress-strain plot of FIG. 2, two stages will be noted. The initial plot is that of the Young's modulus and the latter portion of the plot is the bulk modulus component.

To calculate Young's modulus from the initial slope of the stress-strain plot, a tangent T1 is drawn to the first stage of the plot. A normal N1 is then dropped from the midpoint to the base line. The change in length is obtained by noting the displacement along the X-axis (the distance between origin and the normal). Young's modulus is then calculated as follows:

$$E = \frac{\frac{\text{load}}{\text{original area}}}{\frac{\text{change in length}}{\text{original length}}}$$

The area is the area of the unstrained plunger through which the load is transmitted to the specimen. The load is obtained directly from the stress-strain plot by measuring the height of the normal N1. Before placing the sample in the tester its length is measured, and the decrease in length under compression is obtained from the displacement along the X axis of the stress-strain plot.

Bulk modulus is calculated from the stress-strain plot by drawing a tangent T2 to the second stage of the plot, dropping a normal N2 from the midpoint of tangent T2 to the base line. The length of the line from the origin to the midpoint and of the normal from the midpoint to the base line are then accurately measured. Bulk modulus is then calculated as follows:

$$B = \frac{\frac{\text{load}}{\text{original area}}}{\frac{\text{change in volume}}{\text{original volume}}}$$

The area is the area of the unstrained plunger through which the load is transmitted to the sample. The load is obtained directly from the stress-strain plot by measuring the height of the normal N2. The change in volume is obtained by noting the displacement along the X-axis.

Poisson's ratio is mathematically determined by the following equation using known values of Young's modulus and bulk modulus.

$$\mu = (3B - E)/6B$$

Referring again to FIG. 1, it can be seen that heating bands 38 and 40 are provided circumferentially about upper and lower casing sections 10 and 12 to enable the tester to be heated to a preselected temperature which may be controlled by a thermocouple (not shown) housed within a thermocouple well 42 such that the various physical characteristics determined during a test sequence may be determined as a function of temperature.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A method of determining a plurality of physical characteristics of a material from a single cylindrical test specimen comprising the steps of:
    applying a first axial compressive load to said specimen while allowing said specimen to freely expand radially;
    radially constraining said specimen to a fixed predetermined diameter while said specimen is partially compressed;
    applying a second axially compressive load to said specimen simultaneous with said radial constraint; and
    measuring stress and strain during application of said first and second compressive loads whereby Young's modules, bulk modulus, and Poisson's ratio may be determined.

2. The method of claim 1 wherein said first and second axial compressive loads are slowly and continuously applied.

3. The method of claim 2 wherein said step of measuring stress and strain is continuous throughout the test period.

4. The method of claim 3 further comprising the step of maintaining said specimen at a predetermined temperature whereby Young's modulus, bulk modulus and Poisson's ratio may be determined as a function of temperature.

References Cited

UNITED STATES PATENTS

| | | | |
|---|---|---|---|
| 2,003,749 | 6/1935 | Hughes | 73—89 |
| 2,791,120 | 5/1957 | Dietert et al. | 73—94 X |

JERRY W. MYRACLE, Primary Examiner

U.S. Cl. X.R.

73—94